UNITED STATES PATENT OFFICE.

ANTON MIKOLAJCZAK, OF CASTROP, GERMANY.

DINITROGLYCERIN AND PROCESS OF MAKING THE SAME.

No. 12,669. Specification of Reissued Letters Patent. Reissued July 2, 1907.

Original No. 798,436, dated August 29, 1905. Application for reissue filed October 23, 1906. Serial No. 340,223.

*To all whom it may concern:*

Be it known that I, ANTON MIKOLAJCZAK, a subject of the King of Prussia, residing at Castrop, Westphalia, Germany, have invented certain new and useful Improvements in Dinitroglycerin and Processes of Making the Same, of which the following is a specification.

According to present practice in the manufacture of dynamite, carbonite, and other nitroglycerin explosives the necessary nitroglycerin is prepared in the form of trinitroglycerin of as pure a character as possible, under "nitroglycerin" the glyceric trinitrate, $C_3H_5(O.NO_2)_3$, being understood. This nitroglycerin, also known as "blasting-oil," according to the ordinary method of preparation may unintentionally be mixed with a small quantity of less-nitrated compound glyceric ethers or of dinitroglycerin.

Dinitroglycerin, $C_3H_5(O.NO_2)_2OH$, first prepared in the pure state by me, formerly could not be isolated. The valuable properties of this compound either in consequence remained unrealized, and thus the disadvantages, which, in addition to its many good qualities, attach to nitroglycerin have had to be tolerated. These disadvantages consist in the high sensibility of the substance against mechanical shocks and heat, in the readiness with which it freezes, and the like. They lead to difficulties both in its manufacture and in its application and are the cause of many accidents.

For the purpose of removing the disadvantages of nitroglycerin a number of processes have been invented. I may mention here that of mixing nitrobenzol, amyl nitrate, &c. Most of these processes, however, have proved a total failure, while others have not been employed with real success in practice.

In the employment of dinitroglycerin, $$C_3H_5(ONO_2)_2OH,$$

I have invented a process of manufacturing explosives which offers great advantages over the processes referred to.

1. Dinitroglycerin is a considerably more stable compound than the extremely unstable blasting-oil trinitroglycerin, $C_3H_5(O.NO_2)_3$. It is therefore much less sensible against mechanical shocks and heat than the latter. Pure dinitroglycerin does not explode on ignition at all. By adding a gradually-increasing percentage of dinitroglycerin to trinitroglycerin the dangerous characteristics of the latter can be more and more modified.

2. Dinitroglycerin can be prepared altogether without danger, since any decomposition accidentally occuring in the course of manufacture, even in the case of very large quantities, does not cause explosion, as numerous experiments where decomposition has been purposely brought about have proved.

3. Dinitroglycerin for all practical purposes may be considered as uncongealable. Its addition to trinitroglycerin lowers the freezing-point of the latter to such an extent that a mixture of, for instance, sixty per cent. dinitro- and forty per cent. trinitro-glycerin was found to remain perfectly fluid during severe frost, while nitroglycerin lixiviated from commercial dynamites, as well as the latter themselves, froze completely under the same experimental conditions.

4. By the selection of suitable quantities of dinitroglycerin and ordinary blasting-oil an oil can be produced superior to ordinary blasting-oil in explosive power, for nitroglycerin contains more oxygen than is necessary for combustion of the carbonic acid and of the hydrogen to water, while dinitroglycerin contains too little. Thus by mixing these two compound ethers a product equalizing these two conditions can be obtained, which may be regarded as an ideal blasting-oil and whereby the greatest possible explosive force is obtained.

5. What has been said in paragraphs 1, 3, and 4 in respect to dinitroglycerin and its mixtures with blasting-oil naturally applies also to all explosives prepared from the same for shooting and blasting purposes. In the case of such explosive powders for shooting or military purposes there is the additional advantage that on account of the lower temperature of the generated gases, which are also much more slowly generated, the barrel of the gun is attacked to a much less degree than in the case of the well-known nitroglycerin powders.

6. Dinitroglycerin is not only readily soluble in every proportion in nitroglycerin, but by its aid any suitable mixture of di and tri nitroglycerin can be prepared directly.

7. Dinitroglycerin is just as good a solvent and gelatinizing medium for various substances (such as nitrocellulose, xyloidin, &c.) as is trinitroglycerin.

The following examples of explosives may be here given:

*a.* Sixty-one per cent. dinitroglycerin, 1.8 per cent. soluble pyroxylin, thirty per cent. potassium nitrate, 7.2 per cent. wood-meal; total, one hundred per cent.

*b.* 38.4 per cent. dinitroglycerin, 25.6 per cent. blasting-oil, (trinitroglycerin,) 1.7 per cent. soluble pyroxylin, twenty-seven per cent. osdium nitrate, 7.3 per cent. wood-meal; total, one hundred per cent.

*c.* Seventeen per cent. dinitroglycerin, fifty-eight per cent. blasting-oil, twenty-three per cent. infusorial earth, (kieselguhr,) two per cent. chalk; total, one hundred per cent.

*d.* Fifty per cent. dinitroglycerin, forty-nine per cent. soluble pyroxylin, one per cent. diphenylamin; total, one hundred per cent.

*e.* Twenty per cent. dinitroglycerin, eighty per cent. soluble pyroxylin; total, one hundred per cent.

*f.* Forty per cent. dinitroglycerin, ten per cent. blasting-oil, forty-nine per cent. soluble pyroxylin, one per cent. diphenylamin; total, one hundred per cent.

*g.* Twelve per cent. dinitroglycerin, eight per cent. trinitroglycerin, seventy-nine per cent. nitro-starch, one per cent. diphenylamin; total, one hundred per cent.

*h.* 7.5 per cent. dinitroglycerin, 42.5 per cent. trinitroglycerin, forty-nine per cent. soluble pyroxylin, one per cent. diphenylamin; total, one hundred per cent.

*i.* Forty-five per cent. dinitroglycerin, thirty per cent. trinitroglycerin, two per cent. chalk, twenty-three per cent. infusorial earth, (kieselguhr;) total, one hundred per cent.

*k.* Forty-one per cent. dinitroglycerin, thirty-four per cent. trinitroglycerin, one per cent. chalk, twenty-four per cent. infusorial earth, (kieselguhr;) total, one hundred per cent.

*l.* Fourteen per cent. dinitroglycerin, seventy-eight per cent. trinitroglycerin, eight per cent. soluble pyroxylin; total, one hundred per cent.

*m.* 12.5 per cent. dinitroglycerin, 62.5 per cent. trinitroglycerin, one per cent. chalk, twenty-four per cent. infusorial earth, (kieselguhr;) total, one hundred per cent.

As an example of my method of manufacturing dinitroglycerin I may cite the following: To ten parts, by weight, of glycerin of 1.262 specific gravity thirty-three parts, by weight, of nitric acid of 1.50 specific gravity are added, preferably by allowing the nitric acid to slowly flow into the glycerin while being stirred, (the temperature being kept down.) The mixture, chiefly mono-nitroglycerin, is now allowed to cool for some time (it may be several hours) until the mono-nitroglycerin is converted into dinitroglycerin. The entire mass is then diluted with about ten parts, by weight, of cold water and the nitric acid neutralized by a suitable agent until the lye—for example, in case of using carbonate of lime for neutralization—has a specific gravity of 1.58. The dinitroglycerin rises therein and can be readily separated, purified, and dried. Any dinitroglycerin which may remain in the lye can be readily removed by means of a solvent, such as ether, and obtained from the latter by distillation. If desired, the mixture of oil and lye deprived of acid can be treated in the same manner without prior separation, no technical difficulties being presented.

Dinitroglycerin is obtained as a colorless oil when the glycerin and the nitric acid are colorless—that is to say, free from impurities. It is soluble in water to a large extent, and by reason of this property can very well be obtained quite pure—for instance, by fractional evaporation of the water. The well-known solvents for nitroglycerin also readily absorb dinitroglycerin. The percentage of nitrogen according to calculation is 15.38. An actual analysis (nitrometer and organic analysis) showed the average to be 15.38 per cent.

If mixtures of dinitroglycerin with trinitroglycerin are employed for manufacturing explosives or gunpowder, the dinitrin and trinitrin can first be prepared separately and then mixed. If, however, from nitric acid and sulphuric acid a suitable mixture of certain nitrifying efficiency or nitration value is made, said mixture may be used for preparing and obtaining direct a mixture of both the trinitroglycerin and the dinitroglycerin—*i. e.*, a mixture containing the desired percentage of dinitroglycerin.

On the percentage of di- and tri- nitroglycerin in the product, in addition to the concentration and proportion of the two acids, the temperature and the duration of nitrification exert an influence, as well known in the case of nitrifications generally.

With this method of working, therefore, the separated oil consists of di- and tri- nitroglycerin. A considerable part of the nitrated glycerin remains dissolved in the waste acid and can by the addition of further acid mixture, concentrated sulphuric acid, or other dehydrating agent be separated from it in the form of an oil consisting partly or wholly of trinitroglycerin.

What I claim as my invention and desire to secure by Letters Patent, is:—

1. The process of manufacturing dinitroglycerin which consists in reacting on glycerin with nitric acid, maintaining a low temperature until dinitroglycerin is formed and neutralizing the excess of acid, as set forth.

2. The process of manufacturing dinitroglycerin which consists in reacting on glycerin with nitric acid, maintaining a low temperature until dinitroglycerin is formed and neutralizing the excess of acid by means of an alkaline carbonate.

3. The process of manufacturing dinitroglycerin which consists in reacting on glycerin with nitric acid, maintaining a low temperature until dinitroglycerin is formed and neutralizing the excess of acid by means of an alkaline earth carbonate.

4. The compound dinitroglycerin, an oily liquid having the formula $C_3H_5OH(ONO_2)2$, and being further characterized by solidifying at a lower temperature and possessing a greater solubility in water than trinitroglycerin.

5. The process of manufacturing dinitroglycerin, which consists in producing an acid solution of dinitroglycerin, by reacting on glycerin with nitric acid and separating the dinitroglycerin in the mixture by neutralizing the excess of acid.

6. The process of manufacturing dinitroglycerin, which consists in producing an acid solution of dinitroglycerin by reacting on glycerin with nitric acid, and then separating the dinitroglycerin from the solution.

7. In the process of manufacturing dinitroglycerin, the steps which consist in reacting on glycerin with nitric acid and allowing the mixture to stand until the mono-nitroglycerin formed has been converted into dinitroglycerin.

8. The process of manufacturing dinitroglycerin, which consists in reacting on glycerin with nitric acid, allowing the mixture to stand until the mono-nitroglycerin formed has been converted into dinitroglycerin and then separating the dinitroglycerin from the solution thus produced.

9. The process of manufacturing dinitroglycerin which consists in reacting on glycerin with nitric acid, allowing the mixture to stand, until the mononitroglycerin formed has been converted into dinitroglycerin, diluting the mixture by the addition of water and separating the dinitroglycerin.

In testimony whereof I have affixed my signature in presence of two witnesses.

ANTON MIKOLAJCZAK.

Witnesses:
ERNEST SCHOU,
FRANZ HARTMANN.